E. SPENCER.
COFFEE-STEEPER.
No. 174,983. Patented March 21, 1876.
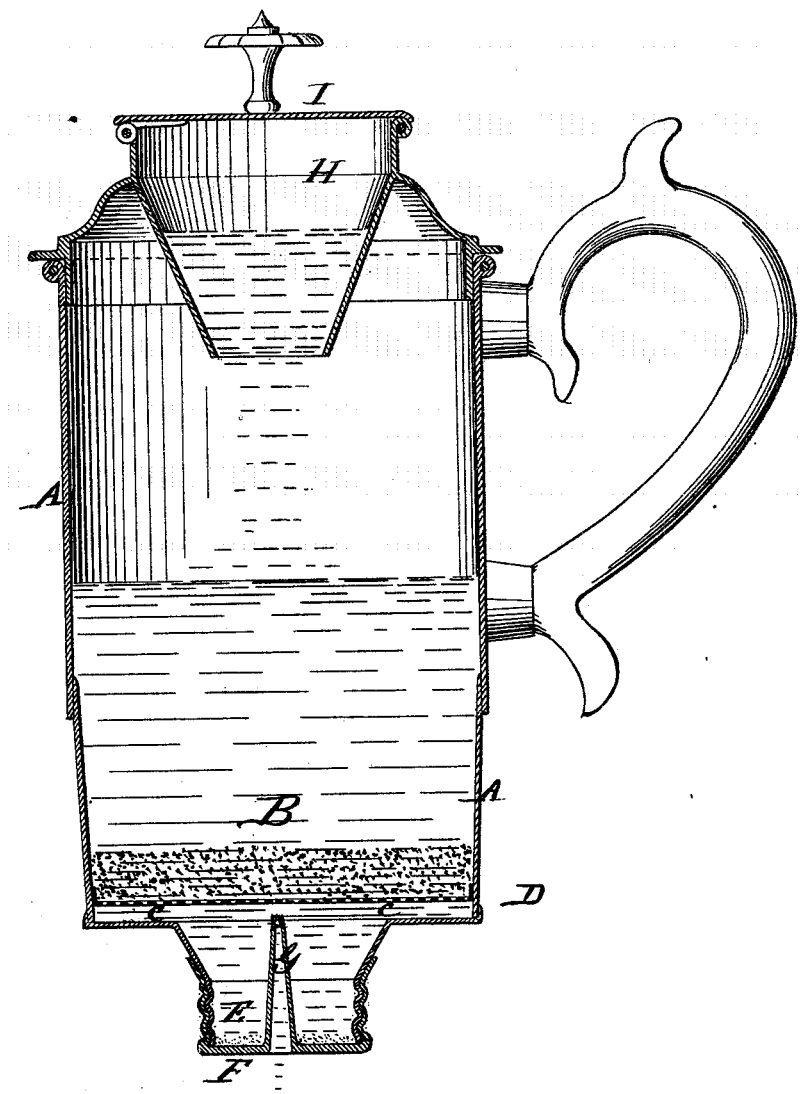
Witnesses:
L. G. Garrettson
R. L. Garrettson
Inventor:
Edward Spencer
By his Atty

UNITED STATES PATENT OFFICE.

EDWARD SPENCER, OF ST. LOUIS, MISSOURI.

IMPROVEMENT IN COFFEE-STEEPERS.

Specification forming part of Letters Patent No. 174,983, dated March 21, 1876; application filed February 4, 1876.

*To all whom it may concern:*

Be it known that I, EDWARD SPENCER, of St. Louis, in the county of St. Louis and State of Missouri, have invented a new Coffee-Steeper; and I do hereby declare the following to be a full, clear, and exact description of the same, reference being had to the accompanying drawing, making part of this specification, in which is shown a longitudinal vertical section through my said improved coffee-steeper.

The object of my invention is to extract more thoroughly the essence or juice of the coffee, and at the same time save its aroma; and my invention consists of a vessel constructed to receive the water upon the coffee, and retain it long enough to extract the juice, and in such manner as to prevent the escape of the aroma, and at the same time allow the beverage to drain slowly into the serving-vessel. Such a vessel is illustrated by the drawing. It consists of a can, A A, the lower end of which is made slightly conical to snugly fit the top of the serving-vessel.

This can is divided in two chambers, B C, by means of a perforated partition-plate, D. Upon the lower end or bottom of the can a nozzle, E, is made, which is covered with a screw-cap, F. This cap is fitted with a conical tube or tubes, G, the upper end or ends of which reach up above the bottom of the can. The upper end of the can is fitted with a funnel-shaped cover, H, provided with a lid, I, substantially in the manner shown.

Let the steeper be set in the serving-vessel, and let the coffee be placed in the chamber B, and let the necessary water be thrown through the funnel upon the coffee: The water, as it is thrown in, will fill the funnel and prevent the escape of the aroma until the lid is closed, which should of course be done as soon as possible after the water is supplied.

Now, by means of the conical tube or tubes in the cover of the nozzle E, the water is checked, or it may be entirely stopped, if need be, in its flow through the coffee, and is retained long enough to thoroughly extract the strength—that is, the juice and aroma—out of it, while at the same time the beverage slowly flows into the serving-vessel. The top of the conical tube should be made small to check the flow, and conical to prevent clogging, and there may be any number of them that circumstances may require.

The form of the can or steeper and its several parts may of course be changed to suit the taste or fancy of the maker or user; but the form shown and described embodies the principle and answers a very good purpose.

I claim as my invention—

A coffee-steeper consisting of a can divided in chambers by means of a perforated partition-plate, and combined with a removable bottom, which is fitted with a tube or tubes, by which the water is retained on the coffee long enough to extract its strength, without stopping the flow of the beverage to the serving-vessel.

E. SPENCER.

Witnesses:
M. B. SPENCER,
H. F. HOPPINS.